United States Patent Office 3,437,108
Patented Apr. 8, 1969

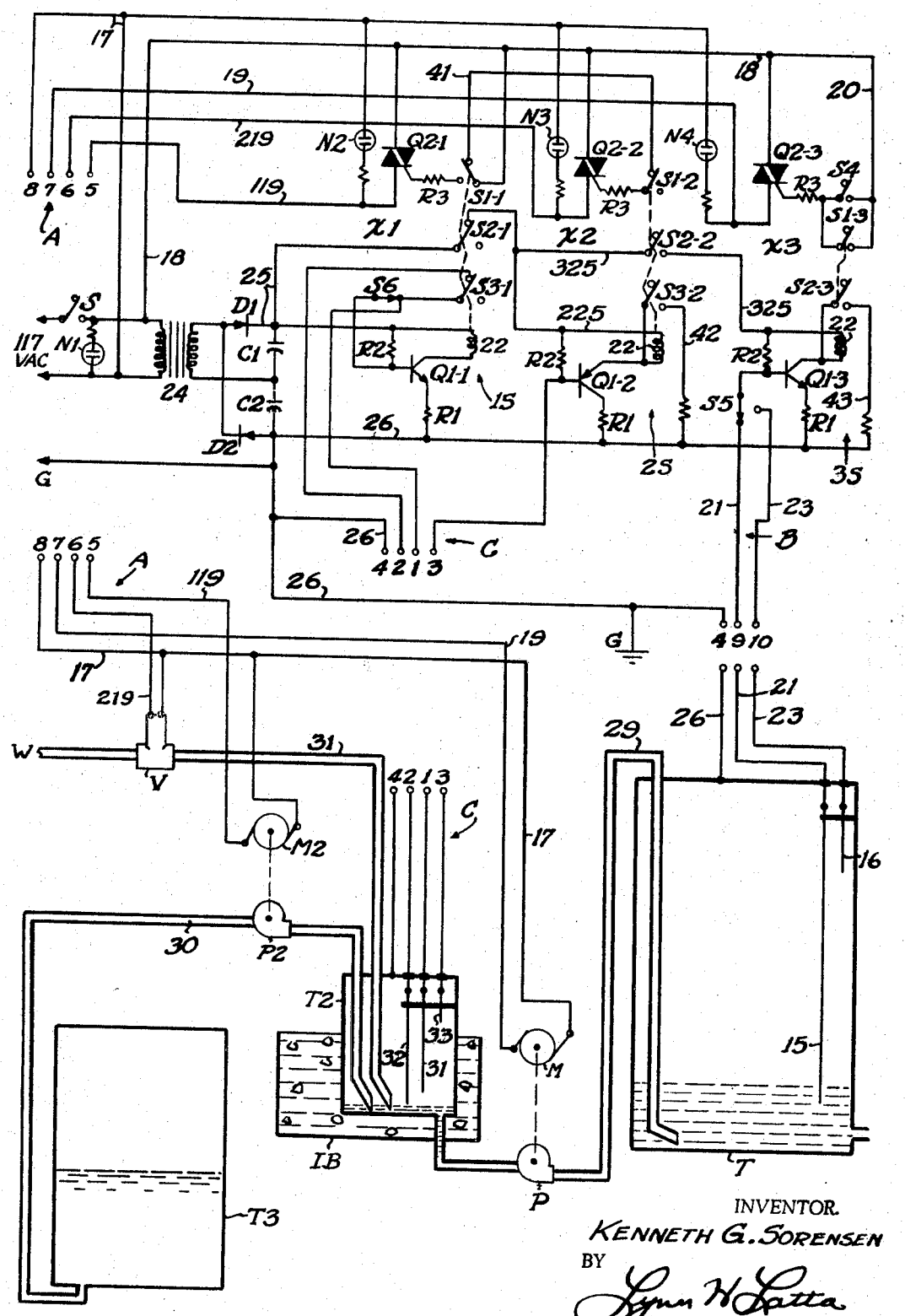

3,437,108
FLUID MIXING AND TANK FILLING SYSTEM AND CONTROL CIRCUIT FOR THE SAME
Kenneth G. Sorensen, 12118 Ohio,
Los Angeles, Calif. 90025
Filed Apr. 13, 1967, Ser. No. 630,735
Int. Cl. F16k 31/10
U.S. Cl. 137—392
9 Claims

ABSTRACT OF THE DISCLOSURE

Disclosed herein is a system for mixing fluids and transferring the mixture into a receptacle, such as a tank, from which the mixture is withdrawn as it is used. The system may be utilized, for example, in diluting a syrup with water for a carbonated beverage in a holding tank from which it is withdrawn into a soda fountain carbonator.

Also disclosed is an electronic control circuit including a liquid level responsive transistorized pilot circuit controlling a sensitive reed relay with a current of only a few milliamperes, which in turn controls a triac switching unit for supplying current to a pump on demand in response to low liquid level in a tank, and for turning off the pump when the tank is refilled by operation of the pump.

The system disclosed herein utilizes a plurality (e.g. three) of such control circuits for automatic control of successive cycling operations in each of which a relatively small volume mixing tank is successively filled with the two fluids which are mixed during such fillings, and successively emptied, when filled, into a relatively large volume storage tank, the several cycles of filling and emptying the mixing tank being continued without interruption until the storage tank is filled, and being automatically arrested in response to arrival of the liquid in the storage tank at a filled-tank level or other selected maximum liquid height.

Background of invention

Liquid level detection circuits utilizing bias-controlled electronic components such as vacuum tubes, transistors, solid-state rectifiers, etc. for detecting liquid level limits at small current values to excite much heavier current-carrying circuits for operating indicators or functional units such as valves, pumps, etc., have heretofore been utilized and have been disclosed, insofar as I am aware, in the following prior patents: T. L. LaPointe, 3,206,615; Kenneth G. Sorensen, 3,252,420.

I am not aware of any prior tank-filling system wherein a series of continuous consecutive cycles of filling a small tank and empting it into a large tank are automatically controlled by liquid level demand in the large tank.

Summary of invention

The system of this invention is particularly characterized in that respect controls for (1) supplying a first fluid (e.g. syrup) and (2) supplying a second fluid (e.g. water) are operated conjointly in successive continuous cycles of mixing their respective fluids at a predetermined mix ratio in a mixing tank and discharging successive fillings of the mixing tank; and such cycling operation is turned on and off in response to arrivals of the liquid level in the holding tank at low and high levels respectively.

The unit control circuit of the invention is particularly characterized by the use of a liquid-level sensing unit embodying a single-transistor circuit, excited by a very low amperage signal in the form of a pulsing direct current, in response to a change in liquid level in a tank, to develop a low amperage transistor output current which is utilized to energize a sensitive reed relay, and by the use of a pair of silicon-controlled rectifiers in a triac combination, as a switching unit which is bias-controlled by the reed relay so as to transmit an alternating current of such wattage and full-wave character (e.g. ordinary 117 volt commercial current) as to operate a conventional induction motor for driving a pump or other common electric appliance. A step-down transformer and half-wave rectifier are utilized for taking off a small increment of the alternating current supply to provide a power supply for the sensing unit.

The general object of the invention is to provide a tank-filling system in which one or more liquids are injected from a source of supply such as a reservoir or a liquid supply line (e.g. water line) into a transfer tank which is filled and emptied into a receiving and holding tank in a plurality of successive cycles automatically controlled by liquid level in the transfer tank, in a period of cycling operation which is terminated and started over again in response to high and low liquid levels respectively in the receiving tank.

A further object is to provide such a system wherein two different liquids can be injected successively into and mixed in the transfer tank in a predetermined mix ratio, with automatic control of the injection of both liquids and of the mix ratio in response to liquid levels in the transfer tank.

Another object is to provide such a system having a relatively simple power supply and control circuit involving the use of triac switching units each controlled by a sensitive reed relay which in turn is controlled at least partially by a single transistor, the control circuits being operated by low voltage current derived from higher voltage alternating power current which is utilized to actuate pump and valve elements for liquid transfer and injection.

A further object is to provide, in such a system, simple manual control means for over-riding the automatic controls to effect operation under a cycling schedule different from the automatic cycling pattern.

Description

Referring now to the drawing in detail, I have shown therein, as an example of one particular tank-filling system in which the invention may be embodied, a beverage syrup mix supply apparatus comprising, in general, a relatively large precooler tank T for receiving and holding a supply of cooled beverage mix, ready to be drawn into a carbonator tank of a conventional soda-fountain apparatus; a mixing tank T2 which is relatively small in relation to tank T; a syrup tank T3 for holding a supply of undiluted beverage syrup; a pump P for emptying the contents of tank T2 into tank T through an injection line 29; a motor M for driving pump P; a pump P2 in a syrup line 30, for transferring a quantity of syrup from a reservoir tank T3 into mixing and transfer tank T2; a motor M2 driving pump P2; a water supply W for diluting the syrup drawn from tank T3; a water injection line 31 for injecting the water into tank T2; a solenoid-operated valve V for opening and closing the line 31; and three control circuits X1, X2 and X3 which are conjointly operable to control the cycling of the apparatus to successively fill transfer tank T2 with a mixture of syrup from tank T3 and water from injection line 31, and to successively empty the tank T2 into precooler tank T. Tank T2 is provided with suitable refrigerating means for precooling the mixture therein, the refrigerating means being represented by the ice bath IB.

Two liquid level sensing circuits B are associated with tank T, for controlling its liquid level; three liquid level sensing circuits C are associated with mixing tank T2, for controlling the mixing ratio and cycling thereof; and a plurality of power circuits A are associated with pumps P and P2 and valve V, for effecting operation of the apparatus. The controls shown at the top of the drawing may be grouped together in a control unit which is hooked up to the operating components of the system through connections in one or more junction panels. Such connections, for the transfer tank sensing circuits C, are numbered 1, 2, 3 and 4; for the power circuit A they are numbered 5, 6, 7 and 8; and for the precooler tank sensing circuits B they are numbered 4, 9 and 10. For improved clarity of illustration, the junction connections are shown separated. Connections 5, 6, 7 and 8 join respective sections of conductors 119, 219, 19 and 17 respectively in power circuits A. Connections 4 join several sections of ground conductor 26. Connections 9 and 10 join respective sections of liquid level sensing circuits 21, 23.

The invention utilizes electric power from a common source such as a conventional commercial power circuit, indicated at 117 VAC, such current being fed in power circuits A directly to motors M and M2 which are conventional electric (e.g. induction) motors, to drive the pumps; and to solenoid valve V, for operating the same. The power supply circuit includes a conductor 17 on one side, a master switch S and conductors 18, 19, 119 and 219 on the other side, connected by full-wave switching units Q2 each of a bias-controlled type known as a triac, comprising two silicon-controlled rectifier diodes connected for reduction in opposite directions, each diode conducting a respective half wave. The three triac units Q2 are designated independently as Q2–1, Q2–2 and Q2–3 respectively in the control circuits X1, X2 and X3 respectively. Triacs Q2 are bias-controlled by respective biasing circuits each including a biasing resistor R3 and a bias-control switch S1. The bias control switches S1 are independently designated S1–1, S1–2 and S1–3 respectively in the respective control circuits. Switches S1–1, S1–2 and S1–3 are components of sensitive reed relays 1S, 2S and 3S respectively. Switch S1–3 is in parallel with a manual switch S4 for selective overcontrol or relay 3S.

Relays 1S, 2S and 3S are quite sensitive, each having an armature reed of thin, highly flexible spring strip metal, and operable on a 10 milliampere 12 volt direct current supplied to it as the emitter-collector current output of a respective transistor Q1, in a circuit including the collector and emitter of Q1, a resistor R1, a power supply D1, C1, a common ground lead 26 from D1, C1, and an independent lead 25, 225 or 325. The transistors Q1 are independently designated Q1–1, Q1–2, and Q1–3 in the respective control circuits. Twelve volt current is drawn from the power supply unit D1, C1 comprising the secondary of a step-down transformer 24, a pair of conductor leads 25, 26 connected to respective ends of such secondary; diodes D1 in lead 25 and D2 in lead 26, for unidirectional transmission; and capacitors C1, C2 connected across the leads 25, 26. Conductor 25, and its branch conductors 225 and 325 are each connected to one end of a respective relay coil 22 and to a resistor R2 for supplying biasing voltage to the base of a respective transistor Q1.

Control circuits X1, X2, X3 include the respective reed relays 1S, 2S and 3S each including an energizing coil 22, a transistor Q1 for controlling its respective energizing coil 22, a biasing resistor R2 for each transistor Q1, and a resistor R1 in each relay-energizing circuit.

Control circuits X1, X2 and X3 further include the respective triac switching units Q2–1, Q2–2, and Q2–3 for controlling the respective power circuits utilizing the alternating current from source 117 VAC to energize pump motor M2, valve V and pump motor M respectively.

Control circuit X3 further includes a second manual switch S5 for selectively connecting either electrode 15 or electrode 16 into liquid level sensing circuit B; and circuit X1 includes a manual overcontrol switch S6, the function of which will be explained hereinafter.

Control circuits X1, X2 and X3 further include neon indicator lights N2, N3 and N4 to indicate when the respective triacs Q2–1, Q2–2 and Q2–3 respectively, are conducting, thus indicating whether a respective pump or valve is operating. A neon light N1, across the power leads 17, 18, serves to indicate when power is on. Lights N2–N4 are connected in parallel to power lead 17 and to respective triac circuits 19, 119 and 219 so as to monitor the current flow in those circuits. Thus it is possible to determine remotely, what is happening in the system.

Relay 1S includes the triac biasing switch S1–1, a switch S2–1 exercising control over circuits X2 and X3 through conductors 225 and 325, and a switch S3–1 for connecting the bias resistor R2 of transistor Q1–1 through manual switch S6 and connection 2 to electrode 32 of tank T2. Connection 1, from electrode 31 goes directly to bias resistor R2 through switch S6, shunting switch S3–1 when liquid in tank T2 contacts electrode 31. Switch S1–1 is a double-throw switch, normally closed on a contact which is connected by a bridging conductor 41 to a contact on which bias control switch S1–2 of triac Q2–2 is also normally closed.

Relay 2S includes its triac biasing switch S1–2 and a switch S2–2 normally opening the D.C. current supply 325 to relay 3S. Relay 2S also includes a switch S3–2 in a latching circuit 42, in parallel with the conducting circuit of transistor Q1–2, for holding it in energized condition until it is disconnected from the D.C. current supply at which S2–1 of circuit X1.

Relay 3S includes its triac bias control switch S1–3 and a switch S2–3 in a latching circuit 43, for holding relay 3S energized until it is disconnected from D.C. current supply at switch S2–2 of relay 2S.

*Operation*

Assuming that tank T3 is full and that tanks T and T2 are empty, when the system is turned on by closing the switch to connect it to power source 117 VAC, transistor Q1–1 will conduct, since it is forward-biased by its resistor R2, and its reed relay 1S will be energized, its switch S1–1 thus being reversed from its disclosed position, and closing on its connection to biasing resistor R3 of triac Q2–1, connecting this resistor R3 to power lead 18. Triac Q2–1 will thereby be biased to conductive state. Power from source 117 VAC will then be conducted to motor M2 through power circuit 119, Q2–1, 18 and 17 and connection 8, thus operating pump P2 to start the pumping of syrup into the tank T2. Switch S2–1 of relay 1S will simultaneously open, disconnecting the 12 volt direct current source D1, C1 from leads 225 and 325 and thus rendering the coils 22 of reed relays 2S and 3S inoperative.

Tank T2 will continue to fill with syrup until the liquid rises into contact with the lower end of electrode 31 therein. The base of transistor Q1–1 will then be grounded through conductor connection 1 to biasing resistor R2 of Q1–1 through closed selector switch S6, the circuit being completed through the liquid in tank T2 and through connection 4 to ground conductor 26. The grounding of the transistor base will reverse-bias transistor Q1–1 to a non-conductive state, de-energizing coil 22 of relay 1S, shifting the relay to its disclosed position in which the biasing circuit of triac Q2–1 is opened at switch S1–1, rendering this triac non-conductive and thus arresting the operation of pump P2. This reversal of relay 1S will also close its switch S2–1, restoring direct current power to conductors 225 and 325 and thus to the other two relays. The return of switch S1–1 to its position shown, extends alternating current power from lead 18 through bridging conductor 41 to switch S1–2 of relay 2S and thus to biasing resistor R3 of triac Q2–2, rendering this triac conductive. A power circuit from source 117 VAC to valve V is thus established through conductor 18, triac Q2–2, lead 219, connections 6 and 8, and power lead 17, and valve V is thereby opened, starting to fill tank T2 with water. Finally, the restored D.C. voltage on conductor 225 will reverse-bias the base of transistor Q1–2. Transistor Q1–2 is thus switched to nonconductive state and consequently relay 2S is de-energized and will remain de-energized while tank T2 fills with water.

When the liquid in tank T2 rises into contact with the lower end of electrode 33, the base of transistor Q1–2 is grounded through connection 3 from electrode 33, the liquid in the tank, and its ground connection 4, and transistor Q1–2 is thereby forward-biased to conductive condition. Reed relay 2S is thereby energized, causing it to reverse from the position shown. It is latched by the latching circuit 42 which is established by the closing of its latching switch S3–2 in this reversal, and is maintained independent of the conductive circuit of transistor Q1–2. This reversal of relay 2S also closes its switch S2–2, completing the connection through conductor 325 to bring direct current to control circuit X3. Finally, this reversal of relay 2S opens its switch S1–2, turning off triac Q2–2 and thereby de-energizing the solenoid of valve V, which is self-closing, thus shutting off the flow of water into tank T2.

The closing of circuit 325 to biasing resistor R2 of transistor Q1–3 forward-biases this transistor to conductive state, thus energizing coil 22 of relay 3S and causing it to reverse from its disclosed position. Its latching switch S2–3 thus closes its latching circuit 43 to hold relay 3S independent of the transistor Q1–3, while its switch S1–3 closes the biasing circuit 20 to the biasing resistor R3 of triac Q2–3, turning it on to conductive condition. Through triac Q2–3 and power circuit 18, 19, 17, alternating current is brought through connections 7, 8 to pump motor M, causing pump P to drain the contents of tank T2 into tank T. The draining continues until the level in tank T2 falls below longest electrode 32. Ground connection 2 through switch S3–1 to bias resistor R2 of transistor Q1–1 is thus broken, forward-biasing Q1–1 again to conductive state, energizing relay 1S, opening its switch S2–1 so as to withdraw direct current power from circuits X2 and X3 and to thereby cause relay 3S to return to its disclosed position, opening its switch S1–3 in the biasing circuit of triac Q2–3 and turning it off. Thus alternating current power is withdrawn from motor M and operation of pump P is stopped, thus arresting the transfer of liquid from tank T2 to tank T. This completes one cycle of filling tank T2 with syrup and water mix and transferring it to tank T. Until tank T is filled to the level of its electrode 15, however, a new cycle of filling tank T2 will commence immediately upon the completion of the preceding cycle since transistor Q1–1 has become conductive to start the new cycle.

Filling and draining cycles will continue until the liquid in tank T rises into contact with electrode 15. When this occurs, tank T2 will be filled once more, but will wait to be emptied in tank T until contact between electrode 15 and the liquid in tank T is broken. Breaking the sensing circuit B then starts the draining of tank T2 by forward-biasing transistor Q1–3 to render triac Q2–3 conductive. Once tank T2 starts to drain, it will not stop until its level has fallen below its electrode 32, even though the level in tank T may rise considerably above the lower end of electrode 15.

When the draining of tank T2 on this last cycle is completed, the operation of pump P will be arrested by the removal of ground from transistor Q1–1 as before, and the cycling will then stop, since relay 3S will remain open, and triac Q2–3 non-conductive, until the liquid level in tank T has dropped below the level of its active electrode. Relay 3S will then close, starting up the pump P, draining tank T2, and thus starting a new period of cycling.

Should the user of the apparatus choose to fill tank T each time to the level of high electrode 16, the selector switch S5 is shifted to its alternate positoin, taking electrode 15 out of the circuit B and substituting electrode 16 in the circuit. Operation will then proceed the same as described above, with the exception that the tank T will be filled to the higher level, and a larger volume of liquid will be available for use without refilling tank T in the event the user chooses to turn off the system at power switch S. More cycles of filling and draining tank T2 will occur when the system is again turned on.

The connections of the relays in the circuit are such that when circuit X1 is operating, circuits X2 and X3 will be rendered inoperative by removal of D.C. control current from these circuits so that neither of triacs Q2–2, Q2–3 can conduct. Thus valve V remains closed and pump P is inoperative while motor M2 is energized and pump P2 is pumping. Accordingly, the draining of tank T2 into tank T cannot commence until the filling of tank T2 is completed.

When circuit X1 is turned off, circuit X2 is turned on, thus removing D.C. control current from circuit X3 and preventing it from turning on until circuit X2 has turned off.

The rising of syrup in tank T2 into contact with its middle electrode 31 arrests the pumping of syrup into the tank by pump P2 and starts the injection of water into the tank by the opening of valve V. Thus the length of electrode 31 in relation to electrodes 32 and 33 determines the mix ratio. If the lower end of electrode 31 is equidistant between the lower ends of electrodes 32 and 33, the ratio will be 1:1 (half syrup and half water). Where electrode 31 is longer, the ratio of syrup to water will be less than 1:1, and where electrode 31 is shorter, the ratio will be more than 1:1. The use of reed relays and triacs provides for long periods of operation without breakdown of the electrical system, permitting the system to operate through millions of cycles, much longer than can be attained by use of other types of electrical components. Also, it makes it possible to attain maximum simplicity in the electrical system.

Selector switch S5 makes it possible for the operator to operate tank T at a low level preparatory to cleaning the tank. Thus when cleaning is commenced, only a minimum quantity of liquid in the bottom of tank T will be wasted.

Switch S5 provides selective connections through conductors 21, 23 to liquid level sensing electrodes 15, 16 respectively in tank T, for operating tank T at either of two selected levels. With switch S5 in the position shown the tank will be filled only to the low level determined by the lower end of electrode 15. With the switch S5 in its alternate position, electrode 16 will be substituted for electrode 15 in the liquid level sensing circuit B and the tank will be filled to the higher level determined by electrode 16.

Switches S4 and S6 are operable to manually control the cycling operations in a pattern different from that involved in the automatic cycling, when such may be desirable. For example, switch S4 is normally open. Closing it at any time will turn on triac Q2–3 and actuate pump P for draining tank T2. Switch S6 is normally closed for the automatic operation described above. Opening it will effect forward biasing of transistor Q1–1 by disconnecting its base from the ground circuits, and consequently will turn on triac Q2–1, and operation of pump P2 will be effected regardless of the height of the liquid in tank T2. Thus the pumping of syrup into the tank can, at will, be continued above the level at which it would otherwise be arrested by grounding of electrode 31. If this procedure is employed, the operator can arrest the pumping of syrup and start the flow of water into tank T2 at any time prior to rising of the liquid into contact with electrode 33, simply by reclosing the switch S6. Thus the mix ratio can be controlled manually when desired.

In the broader claims herein, the tank T is referred to as a receiving tank, tank T2 is referred to as a transfer tank and tank T3 is referred to as a reservoir. Pump P and its line are referred to broadly as a transfer means. Pump P2 and valve V and their lines are referred to by the generic term "injector means," since both are operative to effect injection of liquid into tank T2.

Very low voltages are present at the electrodes, eliminating any danger of shock to the operator.

I claim:

1. A tank-filling system comprising:
   a receiving tank;
   a transfer tank;
   injection means comprising at least one electrically operated injector for filling said transfer tank to a selected level;
   electrically operated means to transfer the contents of said transfer tank into said receiving tank;
   power circuits for conducting alternating current from a source to said injector and said transfer means respectively;
   triacs in the respective power circuits for controlling the flow of current in said power circuits;
   control circuits including respective low-voltage relays controlling the biasing of said triacs to conductive and nonconductive states respectively;
   means providing a source of low-voltage current for said control circuits;
   a first transistor for controlling the relay which controls the triac in the power circuit of said injector;
   means responsive to low liquid level in said transfer tank to bias said first transistor to a state such as to cause its respective relay to render its respective triac conductive so as to supply power to said injector for filling said transfer tank; and
   means responsive to high liquid level in said transfer tank to change the bias of said first transistor so as to cause its relay to render its respective triac nonconductive so as to arrest operation of said injector and to simultaneously effect operation of the other relay to bias its respective triac to conductive condition and thereby to conduct power to said transfer means to operate the same to drain the contents of said transfer tank into said receiving tank; said draining being arrested at said low level by the beginning of another cycle of filling said transfer tank by control operation of said low level responsive means.

2. The system defined in claim 1, including;
   a second transistor for controlling the relay which controls the triac in the power circuit of said transfer means; and
   means responsive to elevated liquid level in said receiving tank to bias second transistor to a state such as to operate its respective relay to bias its respective triac to non-conductive state, so as to render said transfer means inoperative, thereby arresting cycling of the apparatus at the end of the ensuing cycle of filling said transfer tank.

3. The system defined in claim 2 wherein;
   said injector means comprises first and second injectors for successively injecting different liquids into said transfer tank;
   said power circuits include first and second power circuits for operating the respective injectors, each of said circuits including a triac for controlling current flow therein; and
   said control circuits include first and second low voltage relays, one for each of said triacs, first and second transistors for controlling the respective relays, and connections including an intermediate liquid level sensing means in said transfer tank, such that the rise of liquid therein to said intermediate level will change the bias on said first transistor so as to cause its relay to render its respective triac conductive for directing power current to the second injector to complete the filling of said transfer tank with the other liquid.

4. The system defined in claim 3, wherein;
   one of said injectors comprises a pump for pumping one liquid into said transfer tank and the other injector comprises a valve and a water line controlled thereby, for injecting water into said transfer tank for mixing with said one liquid.

5. The system defined in claim 1, wherein;
   said injector means comprises first and second injectors for successively injecting different liquids into said transfer tank;
   said power circuits include first and second power circuits for operating the respective injectors, each of said circuits including a triac for controlling current flow therein;
   and said control circuits include first and second low voltage relays, one for each of said triacs, first and second transistors for controlling the respective relays, and connections including an intermediate liquid level sensing means in said transfer tank, such that the rise of liquid therein to said intermediate level will change the bias on said first transistor so as to cause its relay to render its respective triac non-conductive to arrest the injection of one liquid and will simultaneously effect the operation of the second relay to render its respective triac conductive for directing power current to the second injector to complete the filling of said transfer tank with the other liquid; and a manual switch in the biasing circuit of first transistor, for overcontrolling the response of said intermediate level sensing means.

6. The system defined in claim 1, including;
   a second resistor for controlling the relay which controls the triac in the power circuit of said transfer means;
   a pair of electrodes in said receiving tank, for grounding contact with the liquid therein at two different elevated levels therein;
   a manual switch for selectively connecting either of said electrodes to the base of said second transistor, in an arrangement such that contact of the liquid in said receiving tank with the connected electrode will bias said second transistor to a state such as to operate its respective relay to bias its respective triac to nonconductive state, so as to render said transfer means inoperative, thereby arresting cycling of the apparatus at the end of the ensuing cycle of filling said transfer tank.

7. The system defined in claim 1, including;
   a second transistor for controlling the relay which controls the triac in the power circuit of said transfer means; and
   means responsive to elevated liquid level in said receiving tank to bias said second transistor to a state such as to operate its respective relay to bias its respective triac to nonconductive state, so as to render said transfer means inoperative, thereby arresting cycling of the apparatus at the end of the ensuing cycle of filling said transfer tank; and manual overcontrol means for biasing the second triac to conductive state independently of the state of said second transistor, so as to render said transfer means operative at will.

8. The system defined in claim 1, wherein;
   said injector means comprises first and second injectors for successively injecting different liquids into said transfer tank;
   power circuits include first and second power circuits for operating the respective injectors, each of said circuits including a triac for controlling current flow therein;

and said control circuits include first and second low voltage relays, one for each of said triacs, first and second transistors for controlling the respective relays, and connections including an intermediate liquid level sensing means in said transfer tank, such that the rise of liquid therein to said intermediate level will change the bias on said first transistor so as to cause its relay to render its respective triac conductive for directing power current to the second injector to complete the filling of said transfer tank with the other liquid; said first relay including a switch controlling the extension of low voltage power to the second relay, so as to withhold such power from said second relay when said first relay renders its triac conductive.

9. The system defined in claim 1, including:
a second transistor for controlling the relay which controls the triac in the power circuit of said transfer means; and
means responsive to elevated liquid level in said receiving tank to bias said second transistor to a state such as to operate its respective relay to bias its respective triac to nonconductive state, so as to render said transfer means inoperative, thereby arresting cycling of the apparatus at the end of the ensuing cycle of filling said transfer tank; said first relay including a switch controlling the extension of low voltage power to the second relay, so as to withhold such power from said second relay when first relay renders its triac conductive.

References Cited

UNITED STATES PATENTS

| | | | |
|---|---|---|---|
| 3,142,309 | 7/1964 | Minkler | 137—392 |
| 3,351,087 | 11/1967 | Halkiades | 137—392 X |

WILLIAM F. O'DEA, *Primary Examiner.*

DAVID R. MATTHEWS, *Assistant Examiner.*

U.S. Cl. X.R.

317—139